No. 619,330. Patented Feb. 14, 1899.
J. N. MORGAN.
MACHINE FOR GATHERING AND DESTROYING BUGS.
(Application filed July 21, 1897.)
(No Model.)
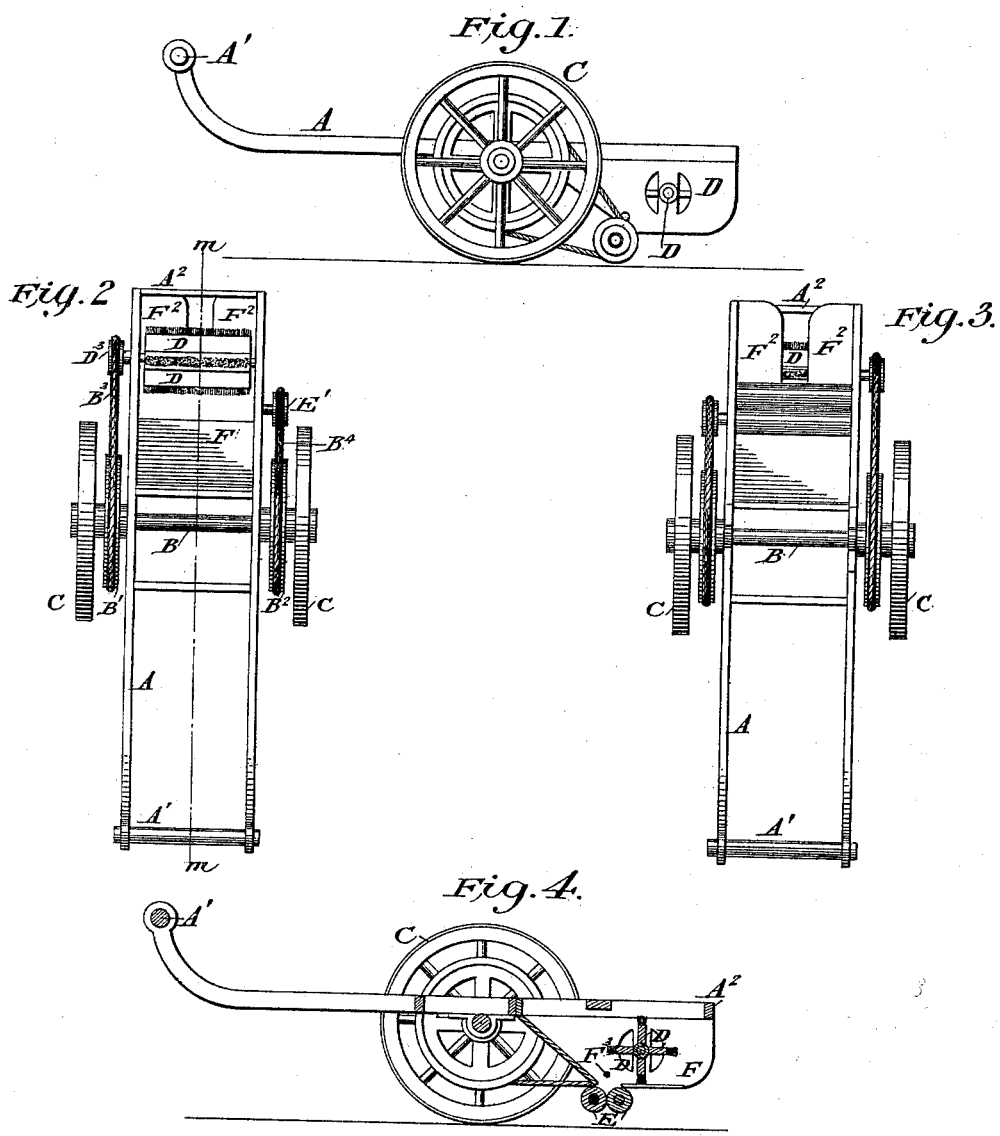

UNITED STATES PATENT OFFICE.

JOSEPH N. MORGAN, OF CRAWFORDSVILLE, INDIANA.

MACHINE FOR GATHERING AND DESTROYING BUGS.

SPECIFICATION forming part of Letters Patent No. 619,330, dated February 14, 1899.

Application filed July 21, 1897. Serial No. 645,485. (No model.)

*To all whom it may concern:*

Be it known that I, JOSEPH N. MORGAN, a citizen of the United States, residing at Crawfordsville, in the county of Montgomery and State of Indiana, have invented a new and useful Machine for Gathering and Destroying Bugs and Insects, of which the following is a specification.

My invention relates particularly to a machine for gathering and destroying what is customarily termed the "potato-bug" or "beetle" from the growing plants and vines, and has for its object the production of a portable gathering and crushing machine of the character described, wherein the machine-frame is mounted on a pair of trucks whose revolving axle operates a rotary fan and a pair of rollers by means of a cable and suitable gears at the fore part of the machine; and it consists in the peculiar construction, combination, and the arrangement of the several parts, as is fully set forth in the following description.

Referring to the drawings, which set forth my invention as embodied in two forms, like letters of reference indicate corresponding parts throughout the several views.

Figure 1 is a side elevation of my invention. Fig. 2 is a top plan view of the same. Fig. 3 is a bottom plan thereof. Fig. 4 is a longitudinal section taken on the line M N, Fig. 2.

In the construction of my invention I use a main frame A, a rotary axle B, a pair of truck-wheels C, an adjustable rotary brush D, a pair of revolving rollers E, and a suitable boxing F.

The main frame A comprises a pair of side parts A, a handle-bar A', and a cross part $A^2$ at the fore end, which when fastened together form a rigid frame.

The axle B is mounted in suitable bearings on the under side of the main frame A and has a pair of sprocket-wheels B' and $B^2$ securely mounted thereon at each side of the main frame for operating the rotary brush D and the rollers E by means of endless cables or ropes $B^3$ and $B^4$. The rotary brush D is positioned transversely across the fore end of the main frame A and is mounted rotatively therein and is held rigidly in position in the main frame by suitable bearings, which allow the rotary brush D to agitate the plants or vines and shake the bugs into the rollers E on the incline F' leading thereto. The brush is provided at its upper end with a small wheel $D^3$, which is encircled and operated by the endless rope $B^3$, which actuates the rotary brush.

The rollers E are positioned transversely across the bottom of the fore part of the main frame and are operated by the endless cable $B^4$, that encircles a small wheel E', mounted on the outer end of one of the roller-spindles. The rollers revolve constantly with the travel of the machine and crush the bugs which are shaken thereon from the plants and from the incline F' leading thereto.

The machine is provided with a pair of fenders $F^2$, which are mounted on the main frame in front of the rollers E, for the purpose of trailing the row of plants or vines gradually into their proper attitude before the rotary brush D and rollers E for agitating and shaking the bugs from the vines.

The fenders $F^2$ catch any bugs that fall from the plants or vines and feed them to the rollers E, which prevents the plants or vines drawing bugs over and out of the rollers when in operation.

A' indicates the handle-bar of the main frame.

It will be seen that my portable machine is operated manually by pushing the machine parallel with and straddling the row of plants or vines, which are agitated briskly by the brush, which fells the bugs over on the rollers or on the incline leading thereto, whereby they are crushed between the revolving rollers and expelled to the ground.

Having thus described my invention, what I claim as new, and desire to secure by Letters Patent, is—

In an insect-destroyer, the combination with the axially-connected wheels, of a framework supported thereon, a hopper beneath the forward end of said framework, said hopper consisting of side portions, an inclined rear portion and shelves or guideways partially closing the bottom thereof, crushing-rollers arranged at the lower end of said inclined portion and beneath the rear ends of said guideways, a rotary brush arranged in said hopper over said guideways, and a pulley-wheel journaled outside of said hopper and connected with said brush, said pulley-wheel being operatively connected with a pulley on the axle of the machine, and one of said crushing-rollers being also connected by means of a band or rope to a pulley-wheel fixed on the axle of the machine, substantially as described.

JOSEPH N. MORGAN.

Witnesses:
J. M. WILLIS,
HARRY E. DAY.